United States Patent [19]
Johnson

[11] 4,198,265
[45] Apr. 15, 1980

[54] METHOD OF REMOVING VOLATILES FROM AN ELASTOMER

[75] Inventor: Charles R. Johnson, Akron, Ohio

[73] Assignee: The Firestone Tire & Rubber Company, Akron, Ohio

[21] Appl. No.: 855,862

[22] Filed: Nov. 30, 1977

[51] Int. Cl.² .............................................. B01D 1/00
[52] U.S. Cl. ................... 159/47 R; 159/2 E; 159/DIG. 10; 528/499; 528/502
[58] Field of Search ............... 159/2 E, 6 WH, 47 R, 159/DIG. 10; 528/499, 501, 502

[56] References Cited

U.S. PATENT DOCUMENTS

| | | | |
|---|---|---|---|
| 3,476,736 | 11/1969 | Kahre | 159/2 E |
| 3,683,511 | 8/1972 | Johnson et al. | 159/2 E |
| 3,799,234 | 3/1974 | Skidmore | 159/2 E |
| 3,963,558 | 6/1976 | Skidmore | 159/2 E |

*Primary Examiner*—Norman Yudkoff

[57] ABSTRACT

The invention relates to a method of continuously removing volatile hydrocarbons from a solution containing them up to about 85% by weight and an elastomer pressurized solution of the elastomer and volatile hydrocarbons is released through an orifice into an elongated conduit at a lower pressure. A portion of the volatile hydrocarbons flashes into vapor and the remaining solution forms discrete crumbs of elastomer having entrapped therein the remaining portion of volatile hydrocarbons. The vapors and crumbs then enter an enclosure maintained at a lower pressure. The vapors are removed at the top of the enclosure while the elastomer crumbs are passed to a sealed extruder and mechanically worked to increase the temperature of the elastomer and then passed through an annular orifice to a zone of reduced pressure, flashing hydrocarbon vapors from the elastomer and venting them from the extruder. The elastomer is then passed to another extruder work section wherein water or an inert gas is added to the elastomer following which vapors are allowed to flash from the mixture and escape through a vent equipped with a screw. The elastomer is discharged from the extruder at a volatile hydrocarbon content of less than about 1.0 percent by weight.

14 Claims, 3 Drawing Figures

METHOD OF REMOVING VOLATILES FROM AN ELASTOMER

BACKGROUND OF THE INVENTION

This invention relates to a method of continuously removing volatile hydrocarbons from an elastomer solution which may contain up to about 85% by weight of such hydrocarbons. More particularly, the invention relates to a method of continuously removing volatile hydrocarbons from an elastomer solution to produce an elastomer product having less than about 1.0 percent by weight of volatile hydrocarbons.

In the manufacture of synthetic rubber by polymerization in an organic diluent medium, the polymer produced must be dried or separated from the diluent before it can be used. In the past, a number of methods of accomplishing this result have been proposed. The most popular early method of dissolventizing synthetic rubber involved coagulation of the rubber in solvent solution by discharging it into water and heating the water so as to steam-distill off diluent and precipitate the polymer into crumbs. The crumb is then dried in a conventional manner, such as by means of a de-watering press and a hot air oven drier.

Alternative methods for removing the water from rubber crumb have employed a screw extruder containing vents along the barrel, through which water vapor passes as the rubber is kneaded and masticated in the extruder. A method and apparatus of this type are shown in U.S. Pat. No. 3,225,453, wherein wet rubber crumb is dried essentially completely by passing it through a vented extruder. The extruder performs mechanical work on the rubber to heat it and to express water from it, and the water in liquid and vapor form is expressed through drainage openings extending the length of the extruder. This process has been found effective in removing water from rubber, since the tearing action of the extruder opens pockets of water contained within the crumb to release moisture.

More recent techniques for drying solution-polymerized elastomers have attempted to avoid the step of coagulation in water. In these newer methods, the problem is one of removal of organic diluent and unreacted monomers only, presenting a new and different system for polymer drying. Since the elastomer, diluent, and monomers are mutually miscible throughout all proportions, in most cases, the situation differs considerably from the process described in the reference patent wherein all the volatile material (water) is immiscible with the elastomer. Examples of such recent techniques for drying solution-polymerized elastomers are U.S. Pat. Nos. 3,683,511 and 3,799,235, commonly assigned to applicants assignee herein.

U.S. Pat. No. 3,683,511 discloses a method of removing volatile hydrocarbons from a solution or mixture of elastomer and volatile hydrocarbons, utilizing an extruder which involves the steps of working the elastomer in the extruder to increase its temperature; admixing an inert gas or water into the elastomer through an inlet in the extruder; allowing vapor to flash from the mixture thus formed through at least one vented section in the extruder and then discharging the elastomer from the end of the extruder at a lower content of volatile hydrocarbons. As further disclosed, the elastomer can be subjected to a plurality of such working, mixing, and flashing operations.

The method for drying solution-polymerized elastomers described in the aforementioned U.S. Pat. No. 3,683,511 represented a distinct advance in the art of drying polymers at the time of its discovery and still is advantageous in many respects. However, the method does have certain disadvantages. Thus, the method is not suitable for drying elastomer solutions or mixtures having volatile contents in excess of about 50 percent, since the viscosity of such solutions or mixtures is ordinarily too low to permit processing through an extruder. As will be evident, such a method would not be suitable for drying solution polymerized elastomers in which the solution often contains up to 85 percent by weight volatiles or more. An additional and significant disadvantage relates to so-called elastomer "fines". Thus, as the elastomer containing volatile hydrocarbons is passed through a zone of reduced pressure, the volatile hydrocarbon rapidly flashes to vapor, often with a violent and explosive force. Usually when this occurs, there is a marked tendency for at least a portion of the polymer to fragment, disintegrate or otherwise subdivide into very fine particles typically having a dimension of 0.5 millimeters or less. These fragmented materials are referred to in the art as "fines".

The "fines" present a number of problems. For example, they must be collected using hoods and other collection equipment to prevent undue contamination of the atmosphere. In addition to the loss of polymer caused by the fines, they also have a tendency to coat the surfaces of the hoods and collection equipment where, upon standing for prolonged periods of time, they degrade. More significantly, the fines often coat the vents of the extruder ultimately causing the vents to become plugged, thereby often resulting in a shut down of the extruder to enable clean up of the vents. As will be appreciated, such extruder shut downs result in a considerable loss of production.

U.S. Pat. No. 3,799,235 discloses a method of removing volatiles from a solution or mixture of elastomer and volatile material which involves releasing the mixture or solution from a zone maintained at a temperature above the normal boiling point of the volatile material and at an initial pressure at least sufficient to keep the volatile material in the liquid state through at least one orifice into one end of a conduit which is at a lower pressure than the initial pressure. Upon entering the conduit, some of the volatile material flashes into vapor and the remaining mixture or solution forms discrete elastomer crumbs. The vapor and elastomer crumbs then exit the conduit into an enclosure maintained at lower pressure following which the vapor is removed from the top of the enclosure and the elastomer crumbs are collected.

The method for drying elastomer solutions or mixtures described in the aforementioned U.S. Pat. No. 3,799,235 also represented a distinct advance in the art of drying polymers at the time of its discovery. However, the method has one distinct disadvantage. Thus, the method is limited in the amount of volatile materials which can be removed from elastomer solutions having a high content of volatiles. For example, as disclosed in the Examples of the patent, the finished elastomer product often contains as much as 15 percent by weight of volatiles or more. This is a considerable disadvantage since elastomers utilized in most commercial applications ordinarily should contain not more than 1.0 percent by weight volatiles and more desirably less than 0.3 percent by weight of volatiles.

SUMMARY OF THE INVENTION

The present invention provides for an improved method of removing volatile hydrocarbons from a solution-polymerized elastomer in which substantially all of the disadvantages of the aforementioned prior art processes are overcome. Thus, the invention provides for a method of continuously removing volatile hydrocarbons from a solution polymerized elastomer which may contain up to 85 percent by weight of volatile hydrocarbons to produce a resultant elastomer product containing 1.0 percent by weight of volatiles or less. In addition, the method provides for efficient control of elastomer fines produced during the process.

The improved process can be briefly summarized as follows with each step being performed in seqence:

A solution of elastomer and volatile hydrocarbons contained in a zone maintained at a temperature above the normal boiling point of the volatile hydrocarbons and at an initial pressure at least sufficient to keep the volatile hydrocarbons in the liquid state, is released through at least one orifice into one end of an elongated conduit, which conduit is at a lower pressure than the initial pressure, whereby a portion of the volatile material flashes into vapor and the remaining solution forms discrete elastomer crumbs, at a rate which produces a vapor velocity in the conduit of from 3 to 70 meters per second and a crumb concentration of from 0.25 to 25 percent by volume in the vapor.

The vapors and elastomer crumbs then exit the conduit into an enclosure maintained at a lower pressure. The vapors are removed at the top of the enclosure while the elastomer crumbs are passed to the screw of a sealed extruder.

In the flashing conduit, preferred limits for the vapor velocity are from 8 to 40 meters per second, and from 0.25 to 6 percent by volume for the crumb concentration in the vapor. Optionally, hot nitrogen can be added to the fluid mixture before it is released through the orifice. The nitrogen should be added at a temperature of from 90° to 200° C. and at a rate of from zero to 0.625 cubic meters per kilogram of elastomer, the nitrogen volume being calculated at standard temperature and pressure (i.e. 0° C. and 760 mm Hg). As another option, a similar quantity of nitrogen can be blown against the crumbs in the crumb collecting means (i.e. sealed extruder) to assist in removing volatile material.

An apparatus which has been found to be particularly advantageous for use in the original flashing operation can be briefly described as follows. Fluid inlet means is provided having at least one orifice. An elongated conduit is provided having an open end and a closed end, the closed end containing the fluid inlet means. The conduit has a minimum cross-section area of about 250 times the total orifice cross-section area and a maximum cross-section area of about 10,000 times the total orifice cross-section area. The length of the conduit is not critical, but should be at least twice its diameter. Below the open end of the conduit is the crumb collecting means (i.e. the screw section of a sealed extruder) and a vapor tight enclosure surrounds the inlet means, crumb collecting means and at least the open end of the conduit.

The conduit can be cyclindrical in shape or can contain a constriction or an offset. Internal baffles can be provided.

A plurality of orifices can be provided with means for selectively blocking at least some of the orifices. The means can be individual valves on the orifices, or a slideable knife valve.

A more detailed description of apparatus which can suitably be employed in the original flashing operation, can be found in the aforementioned U.S. Pat. No. 3,799,235 incorporated herein by reference.

As indicated heretofore, the elastomer crumbs formed during the original flashing operation are passed from the enclosure to the screw of a sealed extruder. The elastomer crumbs are then massed and mechanically worked to increase the temperature of the elastomer following which the elastomer is passed through an annular orifice to a zone of reduced pressure, thereby causing hydrocarbon vapors to flash from the elastomer. The flashing vapors are allowed to escape through a vented section in the extruder. The elastomer containing a further reduced content of volatile hydrocarbons is then passed to another extruder work section and again worked to increase its temperature. At this point, water or an inert gas is then added to the elastomer through an inlet in the extruder work section and mixed with the elastomer following which vapors are allowed to flash from the mixture thus formed and escape through a vent equipped with a screw. The elastomer is then discharged from the end of the extruder at a volatile hydrocarbon content of less than about 1.0 percent by weight.

In a preferred embodiment of the invention, the elastomer is subjected to at least four flashing operations in the extruder system with vapors and any elastomer fines produced during the first flashing operation being passed through a tapered vent, vapors and any elastomer fines produced during the second flashing operation being passed through a tee-piece vent (i.e. a vent located in a tee section formed by attaching extruders together), and vapors and any elastomer fines produced during the last two flashing operations are passed through vents equipped with screws. In addition, in this embodiment, the vapors and fines escaping from one or more of the vents and recycled to the original flashing apparatus at a point below the orifice in the conduit.

In a particularly preferred embodiment of the invention, the elastomer is subjected to at least four flashing operations in the extruder system with vapors and any elastomer fines produced during the first two flashing operations being passed through tee-piece vents and vapors and any elastomer fines produced during the last two flashing operations are passed through vents equipped with screws. In additional advantageous features of this embodiment, the vapor and fines escaping from one or more of the vents are recycled to the original flashing apparatus at a point below the orifice on the conduit, steam is periodically injected through the vents equipped with screws to aid in removal of fines, and an antioxidant and/or oil is added to the elastomer through an inlet in at least one work section of the extruder system.

As indicated above, in the process of the invention, the elastomer product as discharged from the end of the extruder has a volatile hydrocarbon content of less than about 1.0 percent by weight. If it is desired to further reduce the volatile hydrocarbon content of the elastomer, this can readily be accomplished by cutting the elastomer into chips with, for example, a rotary cutter and then weathering the material for a short period of time in conventional weathering equipment to produce an elastomer product having under 0.3 percent by weight of volatile hydrocarbons.

BRIEF DESCRIPTION OF THE DRAWINGS

FIG. 2 is a schematic representation of a preferred embodiment of the invention showing a solution-polymerized elastomer entering an enclosure through a conduit and elastomer crumbs passing into a sealed extruder wherein the crumbs are massed and the elastomer then subjected to a flashing operation in which vapors and elastomer fines are passed through a tapered vent. The elastomer is then passed into two additional extruders attached to the first extruder and subjected to three additional flashing operations in which vapors and elastomer fines produced during one of the flashing operations are passed through a tee-piece vent and vapors and elastomer fines produced from the last two flashing operations are passed through vents equipped with a screw. Vapors from the flashing tank are removed and recovered. Vapors and elastomer fines from at least two of the flashing operations are recycled to the flashing tank and enter at a point below the orifice in the conduit.

DETAILED DESCRIPTION OF THE INVENTION

A more complete understanding of the invention may be obtained by reference to the accompanying drawings and descriptions.

Figure 1:
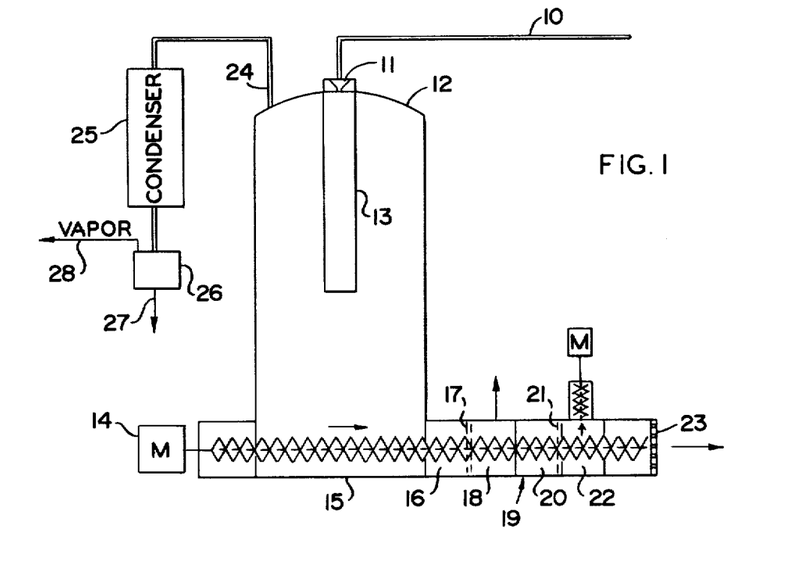
FIG. 1 is a schematic representation of one embodiment of the invention showing a solution-polymerized elastomer entering an enclosure through a conduit and elastomer crumbs passing into a sealed extruder wherein they are massed and the elastomer is then subjected to at least two flashing operations and vapors and elastomer fines from at least one of the flashing operations are passed through a vent equipped with a screw. Vapors from the flashing tank are removed and recovered.

One embodiment of the method of the invention is shown in FIG. 1, wherein the elastomer solution to be dried enters under pressure through line 10 into orifice 11 (described hereinafter). The solution passes from the orifice into conduit 13, which is inside enclosure 12. Upon entering conduit 13, a portion of the volatile hydrocarbons from the elastomer solution flashes into vapor forming a resultant mixture of vapor and elastomer crumbs having entrapped therein the remaining portion of volatile hydrocarbons. The crumbs shoot precisely (as though fired from a gun) into the screw of a sealed extruder 15 which removes the crumbs from the enclosure. Vapors are removed from the enclosure 12 through line 24, and are substantially condensed in condenser 25. Uncondensed vapor and liquid are passed to a separator device 26 (typically a pot) where they are separated; the liquid passing through line 27 to a receiver (not shown) and the vapors passing through line 28 to a compressor system (not shown). The elastomer crumbs are massed and mechanically worked in work section 16 of extruder 15, which is driven by drive mechanism 14 to increase elastomer temperature. The elastomer is then passed through an adjustable circumferential annular orifice 17 (described hereinafter) to a zone of reduced pressure 18 where vapors flash from the elastomer and pass through a vent in the extruder (indicated by arrow) to a vapor recovery system, (not shown). The elastomer is then again mechanically worked in work section 20 of the extruder to increase elastomer temperature. Water or an inert gas is then added to the elastomer through an inlet 19 in work section 20 and mixed into the elastomer. The elastomer is then passed through an adjustable circumferential annular orifice 21 into a zone of reduced pressure 22 where vapors flash from the elastomer and pass through a vent equipped with a single screw 22 (described hereinafter). The elastomer is then passed out of the die plate 23 of the extruder at a reduced content of volatile hydrocarbons (i.e. less than about 1.0 percent by weight). Ordinarily, the elastomer is cut into pieces for easier handling, utilizing a suitable cutter means such as a rotary cutter.

Figure 2:
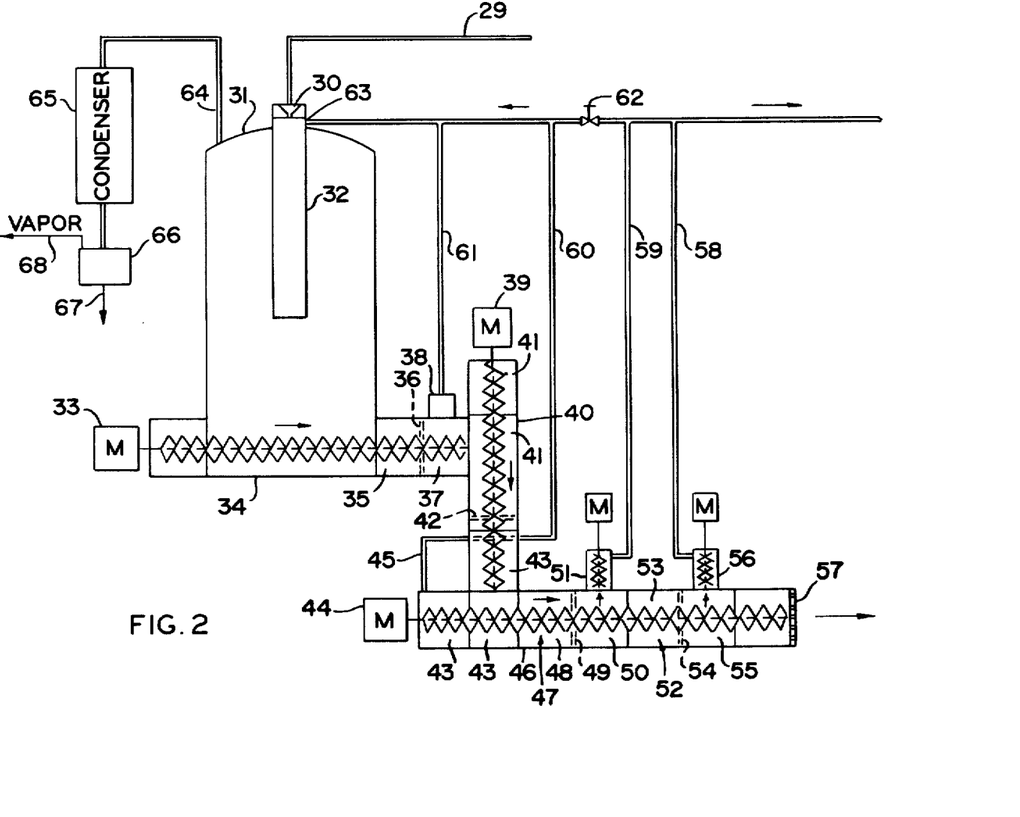

A preferred embodiment of the method of the invention is shown in FIG. 2. In FIG. 2, the elastomer solution to be dried enters under pressure through line 29 into orifice 30. The solution passes from the orifice into conduit 32 which is inside enclosure 31. Upon passing into the conduit, a portion of the volatile hydrocarbons from the solution flashes into vapor forming a resultant mixture of vapor and elastomer crumbs as before. The crumbs shoot precisely into the screw of a sealed extruder 34 which removes the crumbs from the enclosure. Vapors are removed from the enclosure 31 through line 64 and are substantially condensed in condenser 65. Uncondensed vapors and liquid are passed to separator device 66 where they are separated; the liquid passing through line 67 to a receiver (not shown) and the vapors passing through line 68 to a compressor system (not shown). The elastomer crumbs are massed and mechanically worked in work section 35 of extruder 34 which is driven by drive mechanism 33 to increase elastomer temperature. The elastomer is then passed through an adjustable circumferential annular orifice 36 to a zone of reduced pressure 37 where vapors flash from the elastomers and pass out of tapered vent 38 through line 61. A substantial portion of any elastomer fines produced during the flashing operation are entrapped in the tapered vent where they can be readily returned to the extruder by any suitable scraper means. The elastomer containing a reduced content of volatile hydrocarbons is then passed to the work section 41 of a second extruder 40 teed to the first extruder and driven by drive mechanism 39. The elastomer is again mechanically worked to increase its temperature and passed through an adjustable circumferential annular orifice 42 to zones of reduced pressure 43 where vapors flash from the elastomer and pass through a tee-piece vent pipe 45 located in the screw section of a third extruder 46 which is teed to the second extruder 40 and driven by drive mechanism 44. In the reduced pressure sections 43 of the second and third extruders, a portion of elastomer fines produced during the flashing operation are blotted up by the screw and kneaded together with the elastomer and passed forward in extruder 46. The elastomer is again mechanically worked in work section 48 and water or an inert gas is added to the elastomer through an inlet 47 in work section 48 and admixed with the elastomer. The mixture is passed through an adjustable circumferential annular orifice 49 and into a low pressure zone 50 where vapors flash from the elastomer and pass into a single screw vent 51 along with any elastomer fines produced during the flashing operation. Most of the fines are kneaded together in the screw vent and returned to the main screw of the extruder while the vapors pass out of the screw vent by means of line 59. The elastomer then passes forward into the next work section 53 of the extruder where water or an inert gas is again added to the elastomer through an inlet 52 in work section 53 and mixed with the elastomer. After the mixture passes through the adjustable circumferential annular orifice 54, vapors flash from the elastomer and pass into screw vent 56 along with any elastomer fines produced during the flashing operation. Most of the fines are kneaded together and returned to the main screw of the extruder. The elastomer is then passed from the die 57 at the end of the extruder. Vapors and any remaining elastomer fines from the first two flashing operations are passed through lines 60 and 61 and recycled back to the original flashing tank 31 to a point 63 below the orifice 30 in the conduit 32. Vapors and any remaining elastomer fines from the last two flashing operations are passed through lines 58 and 59 to a separate recovery system (not shown).

Figure 3:
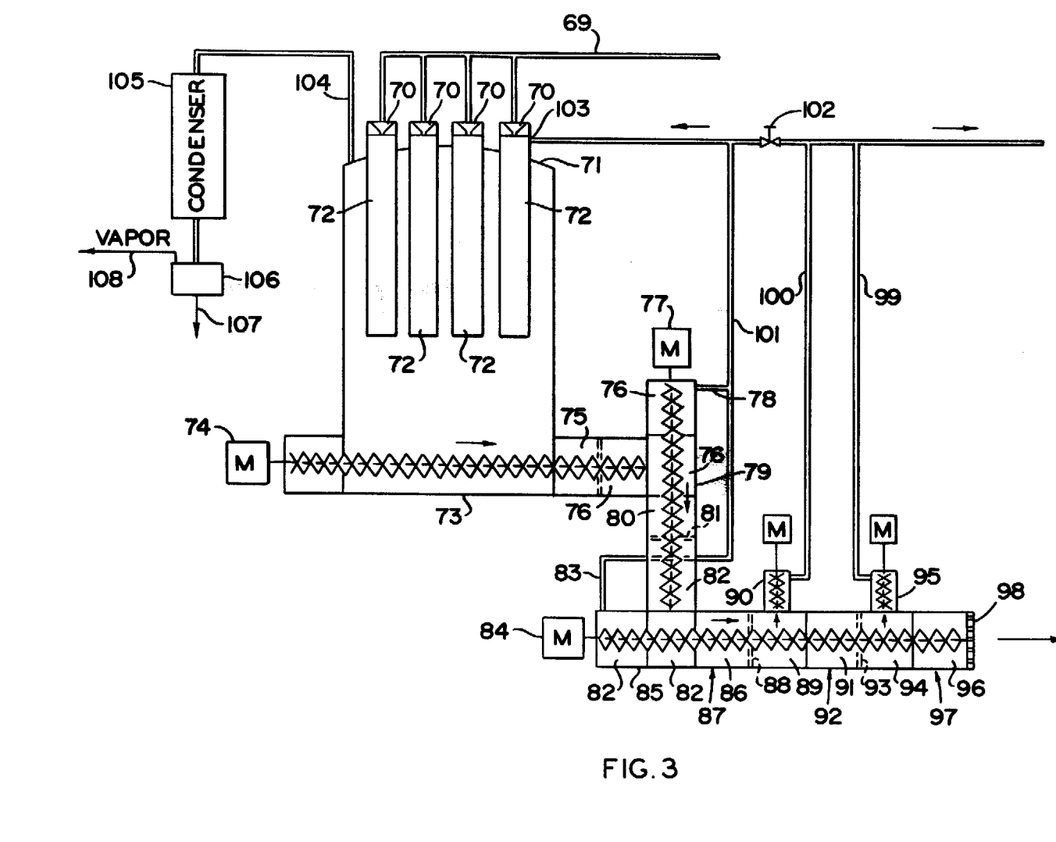
FIG. 3 is a schematic representation of a particularly preferred embodiment of the invention in which vapors from the first two flashing operations are passed through vents in the tee sections formed by attaching the extruders together, vapors from the last two flashing operations are passed through vents equipped with screws, and an oil and/or antioxidant is added to the elastomer in at least one work section of the extruder. Vapors and elastomer fines from the first two flashing operations are recycled to the flashing tank and enter at a point below the orifice in one of the conduits.

A particularly preferred embodiment of the method of the invention is shown in FIG. 3. In FIG. 3, the elastomer solution to be dried enters under pressure through line 69 into orifices 70. The solution then passes through orifices 70 into conduits 72 which are inside enclosure 71. Upon entering conduits 72, a portion of the volatile hydrocarbons in the solution flash into vapor forming a resultant mixture of vapors and elastomer crumbs as described in FIG. 1. The elastomer crumbs shoot precisely into the screw of a sealed extruder 73 which removes the crumbs from the enclosure. Vapors are removed from the enclosure 71 through line 104 and are substantially condensed in condenser 105. Uncondensed vapors and liquid are passed to a separator device 106 where they are separated; the liquid passing through line 107 to a receiver (not shown) and the vapors passing through line 108 to a compressor system (not shown). The elastomer crumbs are massed and mechanically worked in work section 75 of extruder 73 which is driven by drive mechanism 74 to increase elastomer temperature. The elastomer is then passed through an adjustable circumferential annular orifice 75 to zones of reduced pressure 76 (including the first screw section of a second extruder 79 teed to the first extruder and driven by drive mechanism 77). Vapors flashed from the elastomer in the zones of reduced pressure pass through tee-piece vent pipe 78 to line 101 which along with elastomer fines are recycled to the flash tank to a point 103 below the orifice in the conduit. The elastomer is then again mechanically worked in work section 80 to increase its temperature and passed through an adjustable circumferential annular orifice 81 to zones of reduced pressure 82 which includes the first screw section of a third extruder 85 driven by drive mechanism 84 and teed (i.e. attached to form a T-shaped structure) to the second extruder 79. Vapors flashed as the elastomer passes from the adjustable circumferential annular orifice 81 into zones of reduced pressure 82 are conveyed along with the elastomers and elastomer fines into the tee-piece section of the third extruder 85.

The vapors and some of the elastomer fines pass through tee-piece vent pipe 83 and are recycled through line 101 to the original flash tank 71 and enter therein at a point 103 below the orifice 70 in the conduit 72. The remaining portion of elastomer fines (i.e. a major proportion) are agglomerated and along with the elastomer passed forward in the third extruder 85 to extruder work section 86. Antioxidant and/or oil is added to the elastomer through an inlet 87 in work section 86 and mixed into the elastomer. The elastomer is again mechanically worked to increase its temperature in work section 86 and passed through an adjustable circumferential annular orifice 88 to a zone of reduced pressure 89. Vapors flashing from the elastomer along with elastomer fines pass into screw vent 90 where the fines are returned to the extruder. The vapors pass through line 100 and are removed to a separate recovery system (not shown). The elastomer then passes into extruder work section 91 where water or an inert gas is added to the elastomer through an inlet 92 (indicated by arrow) in extruder work section 91 and mixed with the elastomer. The mixture is then passed through an adjustable circumferential annular orifice 93 to a zone of reduced pressure 94. Vapor again flashes from the elastomer and passes through a single screw vent 95 to a separate recovery system (not shown) with any elastomer fines being returned by the single screw to the extruder. The elastomer then passes to extruder work section 96 where water is added to the elastomer through inlet 97 and mixed into it. The elastomer is then passed through a die 98 at the end of the extruder. The water added to the elastomer ahead of the die prevents elastomer scorching as the elastomer passes through the die. In an additional feature (not shown) steam is periodically injected into screw vents 90 and 95 to aid in the removal of elastomer fines from the screws.

The solution of elastomer and volatiles which is the starting material in the process of the invention is typically the effluent from a polymerization vessel, but can be any such solution from which it is desired to remove at least a portion of the volatiles. In the usual case wherein the starting material is the product of a polymerization reaction which product contains diluent and/or unreacted monomers, the solution contains sufficient volatile material to produce a solution fluid enough to be moved through a pipe. For the typical materials contemplated, the volatile content of the incoming solution will usually be from about 65 to 85 percent by weight of the solution. Expressed in another way, the elastomer content of the typical solution is about 15 to 35 percent.

Solutions containing greater or lesser amounts of volatiles are within the scope of the invention, the only limitation being that the solution is sufficiently fluid to be treated.

The temperature of the solution to be treated should be above the normal boiling point of the volatiles at the pressure to be processed, and is preferably relatively high, since much of the sensible heat of the solution is required to vaporize the volatiles as the solution enters the conduit. Depending on the nature of the volatiles, a temperature of from about 100° to 200° C. is usually advantageous and using the preferred diluents, from about 120° to 160° C. is preferred. Higher temperatures may be harmful to the elastomer or solvent, or both, and more difficult to handle, while temperatures lower than 100° C. may result in insufficient removal of the volatiles.

The solution to be treated should be under sufficient pressure to keep the volatiles in the liquid phase before they pass the orifice. With the recommended diluents a pressure of from 5 to 20 atmospheres is recommended, although higher or lower pressures can be used.

The type of elastomer contained in the solution to be treated is not particularly critical to the operation of the method of the invention. Elastomers which are most successfully treated include butadiene or isoprene homopolymers, butadiene-isoprene copolymers, and copolymers of butadiene or isoprene with a minor proportion of styrene.

Other elastomers which can be successfully treated include copolymers of butadiene or isoprene with acrylonitrile, unsaturated carboxy acids and their esters, vinyl pyridine, and other such copolymerizable monomeric materials.

If the solution is the effluent from a polymerization process, the catalyst can be de-activated before beginning treatment, or, alternatively, the "live" polymer mixture can be treated. By excluding materials which would de-activate or poison the catalyst the volatiles from the flashing steps before water is introduced can be recycled to the polymerization process without the need for purification.

The volatile material normally encountered in solution to be treated will generally be an inert diluent. Diluents can be hydrocarbons, either aliphatic, or aromatic or cycloaliphatic, containing from four to 10 carbon atoms, or $C_4$ to $C_{10}$ alcohols, ethers, or amines. Most common are straight- or branched-chain aliphatic hydrocarbons, such as butanes, pentanes, hexanes, or heptanes. Aromatics, such as benzene, or naphthalene; alkyl-substituted aromatics, such as toluene or xylene, and cycloalkanes such as cyclohexane are also commonly used as diluents, and can be present in solutions to be treated according to the invention. Commercial hexanes and pentanes are most commonly encountered.

The normal boiling points of the volatiles usually found will range from about $-40°$ to $180°$ C. at atmospheric pressure, although higher or lower boiling materials can be advantageously handled.

Since the solution is treated at an initial temperature above the normal boiling point of the volatile materials encountered, an initial pressure which is above normal atmospheric pressure must be used. This initial pressure can be as little as a fraction of an atmosphere or as much as 20 atmospheres or more above atmospheric.

As indicated heretofore, upon release from the zone of higher initial pressure, the elastomer solution passes through an orifice into one end of the conduit.

The precise shape and dimensions of the orifice in the conduit can be varied somewhat. However, the preferred orifice is that shown in the Drawings in which the initial opening is wider than the opening at the end of the orifice. Thus, a preferred orifice has an initial opening diameter of about 8 inches and then rapidly narrows to an opening of about 5/16 inches in diameter which is maintained for a length of about ¼ inch to the end of the orifice.

The conduit, which opens at its opposite end into the enclosure, is at a lower pressure then the initial pressure, and the resulting pressure drop will cause a portion of the volatile material to flash into vapor and the remaining mixture to form discrete crumbs. A water cooled or refrigerated condenser is used to condense most of the flashed vapor leaving the enclosure and a compressor system with by-pass control is employed to discharge the uncondensed vapors and gases which may have entered the system which are condensed at higher pressure and to maintain the desired pressure in the enclosure.

This desired pressure level within the enclosure will be determined by a number of factors, including the boiling point of the volatile material and its concentration in the mixture, and the temperature of the mixture. The desired pressure level is preferably atmospheric pressure or below, although it can be up to 2 atmospheres or higher.

As a result of the flashing into vapor of a portion of the volatile material a large volume increase results, and the remaining mixture forms crumbs. The combination of vapor and crumbs travel the length of the conduit and exits the conduit at its open end. Within the conduit the volume concentration of crumbs in the vapor and the vapor velocity must be controlled in order to practice the method of the invention. Experiments have shown that when the crumb concentration and vapor velocity are within specified limits the crumbs will agglomerate so as to limit the production of fines, and to avoid plugging the conduit or adhering crumbs to the walls of the conduit.

It is sometimes desirable to jacket or insulate the conduit or the enclosure, or both, to retain heat. Steam tracing or jacketing can be supplied where additional heat is required.

A workable crumb concentration of between 0.25 and 25 percent by volume, and preferably between 0.25 and 6 percent by volume, in the vapor has been determined. Concentrations below the minimum figure tend to reduce the agglomeration effect, and generally reflect uneconomically low production rates. Concentrations above the maximum figures tend toward a clogging condition, as well as insufficient removal of volatile material.

Similarly, vapor velocities in the conduit should be controlled between 3 and 70 meters per second, and preferably between 8 and 40 meters per second. Velocities slower than the minimum figures given are generally insufficient to keep crumbs from adhering to the conduit walls, and velocity figures higher than the recommended values hamper agglomeration and cause the crumbs to fly about excessively on leaving the open end of the conduit.

Optionally, heated nitrogen can be introduced into the fluid mixture just ahead of the orifice. This variation adds additional heat to the system, and lowers the crumb concentration in the conduit, while increasing the vapor velocity in the conduit. For the purposes of the velocity and concentration limits the nitrogen can be calculated as a portion of the vapor. From 0 to 0.625 cubic meters of nitrogen per kilogram of elastomer (calculated at $0°$ C. and 760 mm of Hg) is recommended for the level of use, and a temperature range of from $90°$ to $200°$ C. Although nitrogen is recommended, any inert gas can be substituted for nitrogen, avoiding oxygen or air.

The vapor and elastomer crumbs which form in the conduit are passed out of the open end of the conduit. The crumbs fall into the screw of the sealed extruder and the vapor is removed from the enclosure which surrounds the extruder screw section and the open end of the conduit. Vapor removal is accomplished preferably by means of a condenser and compressor system which can be operated so as to produce a reduced pressure within the enclosure.

Because of the agglomeration which has taken place in the conduit, and because the crumb maintains velocity after it leaves the conduit it is directed precisely into the screw at the bottom of the enclosure with a minimum of blowing about. The crumb precisely goes into the screw as if it were shot from a gun. The vapor velocity is reduced in the enclosure to readily release the elastomer pieces directed into the screw.

Vapor velocities within the enclosure but outside the conduit should be kept at a minimum, and preferably below about 2 to 3 meters per second, minimizing or eliminating entrainment of crumbs in the vapor removal step.

As indicated in the specification and Description of FIG. 1 of the Drawings above, the elastomer crumbs pass from the open end of the conduit to the screw section of a sealed extruder where they are massed and then subjected to at least two flashing operations. In the first such operation, the elastomer is mechanically worked to increase its temperature and then passed through an adjustable circumferential annular orifice to a zone of reduced pressure wherein hydrocarbon vapors flash from the elastomer and are passed through a vent in the extruder. In the second such operation, the elastomer having a reduced content of volatiles is again mechanically worked to increase its temperature and then water or an inert gas is added to the elastomer through an inlet in the extruder and mixed with the elastomer following which vapors flash from the elastomer and are passed through a vent equipped with a single screw. The elastomer having a reduced content of volatile hydrocarbons is then passed from the end of the extruder.

The temperature conditions employed in the extruder portion of the process can vary considerably. Thus, temperature limitations are primarily dictated by the boiling point of the volatiles, the stability of the polymers at high temperature, and the limitations of the equipment. While high temperatures favor more efficient removal of volatiles, it is usually undesirable to operate with polybutadiene or styrenebutadiene copolymers at temperatures much in excess of 200° C. Operation below 100° C. is generally inefficient, unless only low boiling materials must be removed.

Pressure conditions in the extruder can also vary. Thus, removal of volatiles can be accomplished at atmospheric pressure but it is usually most advantageous to operate at a pressure of about one atmosphere. If desired, however, the extruder system can be operated at a partial vacuum, or under a pressure of up to 10 atmospheres or more. Pressures will be determined usually by the conditions under which solvent recovery operations are to be performed.

Adjustable circumferential annular orifice sections in the extruder can be of any construction which facilitates removal of volatiles from the elastomer. Suitable adjustable circumferential annular orifice sections typically have annular clearances of 0.015 to 1.75 inches. The preferred adjustable circumferential annular orifice sections employed in the extruder have annular clearances on the order of 0.040 to 0.150 inches. For a detailed description of the design and construction of such adjustable circumferential annular orifices reference can be made to U.S. Pat. No. 3,684,252, issued in the names of William N. Nissle et al and assigned to French Oil Mill Machinery Company, the disclosure of which is hereby incorporated herein by reference.

As illustrated in the embodiment of the invention represented by FIG. 1, following the first flashing operation vapors produced therefrom are passed through a first vent section in the extruder. The first vent section in this embodiment can be of any convenient construction which facilitates removal of the vapors. Thus, the first vent section in this embodiment may be cylindrical, rectangular, or tapered in design. The particular design of the vent is not critical. However, it is important that the vent have sufficient cross-sectional area to reduce the velocity of the escaping vapors to at least about 6.0 meters per second. A vent which achieves this result will cause any elastomer fines produced during the flashing operation to settle on the vent walls where they can be readily returned to the extruder screw by any suitable means such as for example, with a manual or automated scraper. Where a tapered vent is employed in the first vent section as in the preferred embodiment described in FIG. 2, the specific degree of taper can vary. However, a preferred tapered vent will have a taper of at least about 70° so that elastomer fines may readily roll down the sides of the vent.

As indicated, preceding at least one of the flashing operations in the method of the invention, water or an inert gas is added to the elastomer in a work section preceding the flashing zone.

The use of water in the method of the invention presents advantages in several areas of the operation. Water, being immiscible with most of the volatiles encountered, produces a steam-distilling effect in removing the volatile materials. Additionally, water vapor which escapes with the volatile materials can be easily condensed and separated in a solvent recovery system. If desired, both water and an inert gas can be employed in the same operation, though they will preferably be added at different inlet points. In some applications, steam may be used, and can provide additional heat, if required. If it is desired to remove heat from the system, water is an ideal additive, since its relatively high heat of vaporization permits considerable heat removal.

It should be noted here that work sections of the extruders ahead of the orifices make seals so dry solvent can be recovered from initial vent sections and the lesser amount of solvent can be stripped with water from later vent sections and the solvent purified.

The inert gas when employed in the method of the invention can be any gaseous material which will be unreactive with the elastomer or diluent. Elemental gases such as nitrogen, argon, neon, helium, etc. can be used very effectively. Of these, nitrogen is preferred for reasons of cost. Oxygen or oxygen-containing gases such as air are not recommended since oxygen has a degrading effect upon unstabilized elastomers at high temperatures. Additionally, the use of oxygen or oxygen-containing gases together with the volatile hydrocarbons presents a potential fire hazard.

In the case where "live" polymers are employed, and it is desired to recycle the volatiles, the use of an inert gas rather than water is generally preferred, since water mixed with the volatiles would regenerate acetylenes, which are undesirable materials in polymerization. This is especially true of elastomers produced with lithium initiators.

The amount of water or inert gas used depends on such factors as the type of elastomer to be treated, the amount and type of volatiles to be removed, and the temperatures which can be used. In general, from 0.1 percent by weight to 10 percent by weight of water or inert gas, based on the total charge of elastomer and volatiles, is effective. Preferred amounts of water or inert gas range from about 0.5 percent to 7 percent by weight, based on the total charge of elastomers.

The method of the invention is particularly adapted to the treatment of so-called "live" polymers (i.e. polymers which contain residual initiator or live ends) such as those produced with lithium initiators. In the particularly preferred embodiment of the invention described in FIG. 3 of the drawings where a "live" polymer is to be treated by the process, the addition of the antioxidant and/or the oil to an extruder work section preceding an annular orifice (i.e. flashing area) provides a significant advantage in the removal of the volatile hydrocarbons from the live polymer. Thus, it has been found that the addition of an antioxidant alone or in combination with a small amount (i.e. 1 to 5 parts per 100 parts of elastomer) of a processing oil to a work section preceding the annular orifice results in the production of gaseous impurities which act as a stripping agent for the volatile hydrocarbons.

As illustrated in the embodiments of the invention, illustrated by FIGS. 2 and 3, the vapors and any elastomer fines produced during at least one of the flashing operations (FIG. 2), more particularly two (FIG. 3) are passed into tee-piece vent sections of the extruder system. The term "tee-piece" vent as employed through the specification and claims of this application, refers to vent sections located in the T-configuration or tee-section formed by attaching two or more extruders together. The use of such tee-piece vent sections in the extruder system of the method of the invention provides particular advantages. Thus, when tee-piece vent sections such as those illustrated in FIGS. 2 and 3 are employed following a flashing orifice (i.e. an adjustable circumferential annular orifice), the vapors produced during the flashing operation will pass to the rear of the tee-section formed by the extruder and exit through a tee-piece vent pipe while most of the elastomer fines produced during the flashing operation are agglomerated onto the main extruder screw and carried forward thereby into the extruder. For Example, referring to FIG. 2, the vapors produced as the elastomer passes through circumferential annular orifice 42 into zones of reduced pressure 43 will pass rearwardly to the end of the tee (T) formed by attaching extruders 40 and 46 together and exit through tee-piece vent pipe 45 while any elastomer fines produced will tend to agglomerate on the main extruder screw and be carried forward through extruder 46. A similar situation occurs in the embodiment illustrated by FIG. 3. Thus, vapors produced following the first flashing operation in extruder 73 pass into zones of reduced pressure 76 and proceed rearwardly into extruder 79 exiting tee-piece vent pipe 78 while any elastomer fines are agglomerated on the main screw of extruder 79 and carried forward thereon. In like manner, vapors produced following the second flashing operation in extruder 79 pass into zones of reduced pressure 82, and pass rearwardly in extruder 87 and exit at tee-piece vent pipe 83 while any elastomer fines are carried forward by the screw of extruder 87. Suitable tee-piece vent sections which may be employed in the method of this invention are described in co-pending application, Ser. No. 856,104 now U.S. Pat. No. 4,124,306 entitled: "Vent for Devolatilizing Screw Press" filed on an even date herewith in the names of Dean K. Bredeson et al, and assigned jointly to The Firestone Tire & Rubber Company and the French Oil Mill Machinery Corporation, incorporated herein by reference.

As indicated, an important feature of the method of the invention involves the passage of vapors formed from at least one flashing operation, preferably two (i.e. FIGS. 2 and 3) through a vent equipped with a screw. The screw is ordinarily a conventional screw equipped with interrupted flights and breaker bars, or bolts. The screw helps prevent elastomer plugging of the vent. The precise design of the screw employed in the process is not of great significance. However, it is important that the screw have a sufficiently large pitch and small root diameter to reduce the vapor velocity of the escaping vapors to less than about 6.0 meters per second. This reduction in vapor velocity allows "fines" produced during the flashing operation to agglomerate on the screw and vent walls where they are readily returnable by the vent screw to the extruder. Ordinarily, it is preferred that the screw employed in the screw vent be of approximately the same diameter as the extruder screw.

Suitable screw vents which may be employed in the method of this invention are described in co-pending application Ser. No. 856,103 entitled: "Screw Vent" filed on an even date herewith in the name of Greg Craig assigned to the French Oil Mill Machinery Corporation, incorporated herein by reference.

As indicated in FIGS. 2 and 3 above, in the preferred embodiments of the invention, vapors and elastomer fines from at least two of the vents, normally where no water has been added in the preceding work sections, are recycled to the original flashing apparatus at a point below the orifice in the conduit where fines are blotted and agglomerated with flashed elastomer. Such vapors are then removed and recovered through the top of the enclosure.

In the recovery of such vapors from any of the flashing steps, water vapor can be condensed along with the volatile hydrocarbons, and separated by decanting. "Un-condensable" materials, such as inert gases, can be separated in the recovery system and recycled. If water is employed, further drying or purifying processes can be used to obtain waterfree volatile hydrocarbons for recycling.

Aside from the process steps involving "live" polymers discussed above, oil can be added to the elastomer either before or after the volatile hydrocarbons have been removed. For some applications, as much as 50 or more parts by weight of oil per 100 parts of elastomer may be desired in the finished product. This is ordinarily done after the elastomer is discharged from the extruder. When high Mooney elastomers are being treated, it has been found beneficial to add a small amount of oil before the discharge point of the dissolventizing extruders, to soften the elastomer and facilitate the discharge of the product at the end of the extruder. This amount can be from about one to 15 parts by weight of oil per 100 parts of elastomer, preferably from about 3 to about 7 parts by weight per 100 parts of elastomer.

The Examples which follow are submitted for the purpose of further illustrating the nature of the present invention and should not be regarded as a limitation on the scope thereof. Unless otherwise specified, all parts and percentages shown in the Examples are by weight.

EXAMPLE I

The following example illustrates the removal of volatiles from an elastomer solution utilizing the process and apparatus of FIG. 3 of the drawings.

In this example, the elastomer solution was a 24.0 percent polymer solids solution of an 82/18 butadiene/styrene copolymer in hexane. The elastomer solution was at a temperature of 290° F. and was maintained at a pressure of about 0.17 atmosphere. The solution was passed through a 5/16 inch diameter round orifice into a cylindrical conduit having an eight inch diameter. The elastomer crumbs formed during the flashing operation shoot precisely into the screw of the sealed extruder. The elastomer was subjected to four flashing operations. Prior to one of the flashing operations, 1.5 parts of oil and 1.0 part of antioxidant were added to the elastomer. During the last two flashing operations, about 1 part of water per 100 grams of elastomer was added to the elastomer and mixed therein. Upon discharging the elastomer from the end of the third extruder, a sample of the elastomer was analyzed and found to contain 0.8 percent by weight of hexane.

EXAMPLE II

In this example, Example I was repeated utilizing the apparatus and process illustrated in FIG. 3 of the Drawings. Thus, polymer solution was introduced to each orifice and the product of the four conduits was processed in the extruder and solvent removal systems. As in Example I, a sample of the elastomer discharged from the third extruder was analyzed and found to contain 0.8 percent by weight of hexane.

What is claimed is:

1. A method of continuously removing volatile hydrocarbons from a solution of elastomer and volatile hydrocarbons wherein said solution contains up to about 85 percent by weight of said hydrocarbons, said method comprising the steps in sequence of:

(a) releasing the solution of elastomer and volatile hydrocarbons from a zone maintained at a temperature above normal boiling point of the volatile hydrocarbons and at an initial pressure at least sufficient to keep the volatile material in the liquid state, through at least one orifice, said orifice having an initial opening which is wider than the opening at the end of the orifice, into one end of an elongated conduit, which conduit is at a lower pressure than the initial pressure, said conduit having a uniform minimum cross-section area of about 250 times orifice cross-section to about 10,000 times the orifice cross-section, whereby a portion of the volatile hydrocarbons is flashed into vapor and the remaining solution forms discrete crumbs of elastomer having volatile hydrocarbons entrapped therein, at a rate which produces a vapor velocity in the conduit of from 3 to 70 meters per second and a crumb concentration of from 0.25 to 25 percent by volume in the conduit, said crumb concentration and vapor velocity being such as to cause agglomeration of crumbs while limiting production of fines, thereby avoiding plugging of the conduit or adherence of crumbs to the walls thereof;

(b) conducting the vapor and crumbs thus formed out of the opposite end of the conduit into an enclosure;

(c) removing the vapors from the enclosure;

(d) passing said crumbs, which maintain velocity from the conduit, from the enclosure to the screw of the first work section of an extruder;

(e) Mechanically working said crumbs to produce a mass of elastomer and to increase the elastomer temperature;

(f) passing said elastomer through a circumferential annular orifice into a zone of reduced pressure thereby causing hydrocarbon vapors to flash from the elastomer;

(g) allowing said flashing vapors to escape through a vented section in the extruder, wherein said vented section is a cyclindrical, rectangular or tapered vent having a sufficient cross-sectional area to reduce the vapor velocity of the escaping vapors to less than about 6.0 meters per second;

(h) passing said elastomer having a lower content of volatile hydrocarbons to another extruder work section where the elastomer is again worked to increase its temperature;

(i) adding water or an inert gas through an inlet in said second work section and mixing the water or inert gas with the elastomer;

(j) passing said elastomer through a circumferential annular orifice into a zone or reduced pressure thereby causing hydrocarbon vapors to flash from the elastomer;

(k) allowing said vapors to escape through a second vent equipped with a single screw, wherein said screw has a sufficiently large pitch and small root diameter to reduce the vapor velocity to less than about 6.0 meters per second, thereby minimizing entrainment of fines in the vapor; and (l) discharging the elastomer from the end of said extruder at a volatile hydrocarbon content or less than about 1.0 percent by weight.

2. The method of claim 1 wherein the vapors escaping from the vent in step (g) along with the elastomer fines produced during the flashing operation of step (f) are recycled back to the original flash tank to a point below the orifice in the conduit, wherein the fines are blotted by the flashing crumbs and then directed into the screw bottom.

3. The method of claim 1 wherein following step (g) and preceding step (h) the elastomer is subjected to a plurality of mechanical work operations each followed by a flashing operation in which the vapors are allowed to escape through a vent.

4. The method of claim 3 wherein vapors with fines passed through at least one of the vents are introduced at a point under the orifice in the conduit, blotted by the flashing elastomer crumbs and then directed into the screw bottom.

5. The method of claim 1 wherein following step (g) and preceding step (h) the elastomer is subjected to at least two additional mechanical work operations each followed by a flashing operation in which the vapors are allowed to escape through a vent.

6. The method of claim 5 wherein at least one of the vents following the additional flashing operations is equipped with a single screw having a sufficiently large pitch and small root diameter to reduce the vapor velocity to less than about 6.0 meters per second.

7. The method of claim 6 further comprising periodic injection of steam through both vents equipped with said screw.

8. The method of claim 5 wherein following at least one of said additional flashing operations, the vapors produced therefrom are allowed to escape through a tee-piece vent.

9. The method of claim 1 further comprising the periodic injection of steam through the vent equipped with said screw.

10. The method of claim 1 wherein said elastomer is polybutadiene or a copolymer of butadiene and styrene.

11. The method of claim 1 wherein said elastomer is a lithium-terminated polybutadiene or copolymer of butadiene and styrene and an antioxidant or oil or mixture thereof is added to the elastomer in one or more extruder working sections preceding a circumferential annular orifice and said antioxidant or oil or a mixture thereof reacts with said lithium-terminated polybutadiene or copolymer of butadiene and styrene to produce gaseous impurities which serve as stripping agents for volatile hydrocarbons contained in the elastomer.

12. A method of continuously removing volatile hydrocarbons from a solution of elastomer and volatile hydrocarbons wherein said solution contains up to about 85 percent by weight of said hydrocarbons, said method comprising the steps in sequence of:

(a) releasing the solution of elastomer and volatile hydrocarbons from a zone maintained at a temperature above normal boiling point of the volatile hydrocarbons and at an initial pressure at least sufficient to keep the volatile material in the liquid state, through four orifices, said orifice having an initial opening which is wider than the opening at the end of the orifices, into elongated conduits, which conduits are at a lower pressure than the initial pressure, said conduits each having a uniform minimum cross-section area of about 250 times orifice cross-section to about 10,000 times the orifice cross-section, whereby a portion of the volatile hydrocarbons is flashed into vapor and the remaining solution forms discrete crumbs of elastomer having volatile hydrocarbons entrapped therein, at a rate which produces a vapor velocity in the conduits of from 3 to 70 meters per second and a crumb concentration of from 0.25 to 25 percent by volume in the conduit, said crumb concentration and vapor velocity being such as to cause agglomeration of crumbs while limiting production of fines, thereby avoiding plugging of the conduit or adherence of crumbs to the walls thereof;

(b) conducting the vapor and crumbs thus formed out of the ends of the conduits into an enclosure;

(c) removing the vapors from the enclosure;

(d) passing said crumbs, which maintain velocity from the conduit, from the enclosure to the screw of the first work section of a first extruder;

(e) mechanically working said crumbs to produce a mass of elastomer and to increase the elastomer temperature;

(f) passing said elastomer through a circumferential annular orifice into a zone of reduced pressure thereby causing hydrocarbon vapors to flash from the elastomer;

(g) allowing said flashing vapors to escape through a tee-piece vent section located in a tee section formed by attaching a second extruder to said first extruder; whereby said flashing vapors proceed rearwardly to the end of the tee section, while simultaneously elastomer fines produced during the flashing operation are agglomerated and carried forward into the second extruder;

(h) passing said elastomer having a lower content of volatile hydrocarbons to another work section in said second extruder whereby the elastomer is again worked to increase its temperature;

(i) passing said elastomer through a circumferential annular orifice into a zone of reduced pressure thereby causing hydrocarbon vapors to flash from the elastomer;

(j) allowing said flashing vapors to escape through a tee-piece vent section located in a tee-section formed by attaching a third extruder to said second extruder, whereby said flashing vapors proceed rearwardly to the end of the tee-section while simultaneously elastomer fines produced during the flashing operation are agglomerated and carried forward into the third extruder;

(k) admixing antioxidant, oil, or a mixture thereof to the elastomer through an inlet in a work section of said third extruder;

(l) passing said mixture of elastomer with antioxidant, oil, or mixture thereof through a circumferential annular orifice to a zone of reduced pressure thereby causing hydrocarbon vapors to flash from said mixture;

(m) allowing said vapors to escape through a vent equipped with a single screw, wherein said screw has a sufficiently large pitch and small root diameter to reduce the vapor velocity to less than about 6.0 meters per second, thereby minimizing entrainment of fines in the vapor;

(n) passing said elastomer through a second circumferential annular orifice in said extruder to a zone of reduced pressure thereby again causing hydrocarbon vapors to flash from the elastomer;

(o) allowing said vapors to escape through a second vent section equipped with a single screw, wherein said screw has a sufficiently large pitch and small root diameter to reduce the vapor velocity to less than about 6.0 meters per second, thereby minimizing entrainment of fines in the vapor;

(p) adding water to a work section in said third extruder; and (q) discharging the elastomer from the end of said extruder at a volatile hydrocarbon content of less than about 1.0 percent by weight.

13. The method of claim 12 wherein vapors and fines escaping from the tee-piece vents following the first two flashing operations are recycled back to the original flash tank to a point below the orifice in the conduit and wherein the fines are blotted by the flashing crumbs and then directed into the screw bottom.

14. The method of claim 12 further comprising the periodic injection of steam through the vents equipped with screws.

* * * * *